Patented Apr. 15, 1941

2,238,447

UNITED STATES PATENT OFFICE 2,238,447

PREPARATION OF POLYVINYL KETALS

Sidney C. Overbaugh, Belleville, N. J., assignor to E. I. du Pont de Nemours & Company, Wilmington, Del., a corporation of Delaware No Drawing. Application September 16, 1938, Serial No. 230,199

2 Claims. (Cl. 260—66)

This invention relates to the preparation of polyvinyl ketals and, more particularly, to the preparation of polyvinyl ketals from polyvinyl alcohol and cyclic ketones which ketals have properties well adapted for commercial uses.

Heretofore, there have been disclosures of reacting various cyclic ketones with polyvinyl alcohol in the presence of a condensation catalyst of acid reaction. The reaction is similar to the formation of polyvinyl acetals from polyvinyl alcohol and various aldehydes but is more difficult to achieve because the carbonyl groups in ketones are generally less reactive than those in the aldehydes.

It is characteristic of the prior art disclosures of reactions allegedly producing polyvinyl ketals that the amount of cyclic ketone to be used, where specifically stated, is never appreciably in excess of that amount theoretically required for complete reaction with the available hydroxyl groups of the polyvinyl alcohol. By the amount of ketone theoretically required is meant that quantity which would be necessary to combine with all the hydroxyl groups of the polyvinyl alcohol, presumably to give acetals of the alkylidene diether type. Thus, one molecule of the cyclic ketone is assumed to condense or unite with two hydroxyl groups in the polyvinyl alcohol. The reaction, using cyclohexanone as the ketone, probably occurs in the following way:

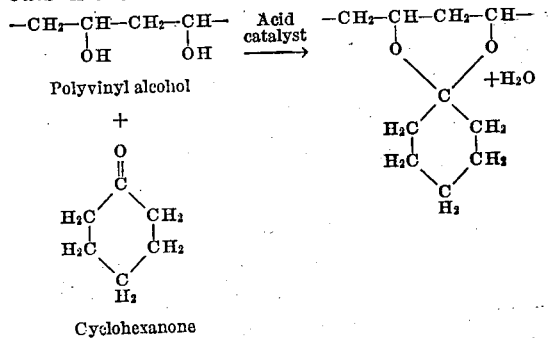

Cyclohexanone

In so far as applicant is aware, by following the specific instructions of these prior art disclosures and using an amount of ketone less than or not appreciably more than that theoretically required for complete reaction with the available hydroxyl groups of the polyvinyl alcohol, products are obtained which are distinctly different with respect to their solubility, thermoplasticity, and water insensitivity characteristics from the products obtained using the proportions of reactants described hereinafter. Chemical analysis of products of this type has shown that unless at least 40% of the available hydroxyls of the polyvinyl alcohol are combined, products possessing the desired solvency, water-resistance, and thermoplasticity are not obtained. It has also been found experimentally that at least a 20% excess of the cyclic ketone over the amount theoretically required to combine with all of the available hydroxyls of the polyvinyl alcohol is needed to obtain the aforementioned degree of reaction.

An object of the present invention is to provide new synthetic resins which may truly be considered polyvinyl ketals. A further object is to provide new resins having valuable properties, particularly in the coating and molding fields. A further object is to provide a simple and readily carried out process of preparing polyvinyl ketals. Other objects will be apparent from the description of the invention given hereinafter.

The above objects are accomplished according to the present invention by condensing polyvinyl alcohol in the presence of a condensation catalyst of acid reaction with a cyclic ketone, said ketone being present in an amount substantially in excess of the amount theoretically required for complete reaction with the available hydroxyl groups of the polyvinyl alcohol, to give a polyvinyl ketal in which a substantial percent of the available hydroxyl groups of the polyvinyl alcohol have been united with the ketone. The cyclic ketone must be present in an amount at least equal to 120% of that theoretically required and the reaction between the polyvinyl alcohol and the ketone should be such that 40% or more of the available hydroxyl groups of the alcohol have been united with the ketone.

As in the formation of polyvinyl acetals, so in the present invention the reaction may be carried out by treating an aqueous solution of polyvinyl alcohol with the ketone, the polyvinyl ketal being precipitated as formed.

However, it is preferred to carry out the reaction in a solvent medium such as methyl or ethyl alcohol which in the presence of excess cyclic ketone is a solvent for the polyvinyl ketal, and subsequently precipitating the product by dilution with water, or the like.

The present invention resides to a considerable extent in the discovery that, by using an amount of cyclic ketone decidedly in excess of the amount theoretically required for the reaction, an appreciable reaction between the available hydroxyl groups of the polyvinyl alcohol and the cyclic ketone takes place in the presence of a catalyst of acid reaction without any particular difficulty.

An amount of ketone equal to 120% of the amount theoretically required is the absolute minimum and it is preferred to use 150–250% of the theoretical amount required. In this manner polyvinyl ketals are readily formed in which 40%, or more, of the available hydroxyl groups have combined with the ketone and it has been further discovered that ketals of this type have highly valuable properties, particularly for molding purposes. In general, the polyvinyl ketals of the present invention are soluble in a limited number of organic solvents, have good resistance toward moisture absorption, are very tough, are thermoplastic, and have relatively high softening temperatures.

The cyclohexanones, either cyclohexanone or the substituted cyclohexanones such as 3-methyl cyclohexanone and 3,5-dimethyl cyclohexanone are particularly adapted for use in the present invention but other cyclic ketones such as 2-methyl cyclohexanone, 4-methyl cyclohexanone, 1-ethyl cyclohexanone, 3,4-dimethyl cyclohexanone, 2-chloro cyclohexanone, 2-bromo cyclohexanone, alpha- and beta-oxotetrahydronaphthalene, p-phenyl cyclohexanone, p-cyclohexyl cyclohexanone, etc., are also well adapted for use in the present invention.

The following examples, in which proportions are in parts by weight unless otherwise stated, illustrate specific embodiments of the present invention:

*Example I.*—A mixture of 11 parts of polyvinyl alcohol (obtained by the hydrolysis of polyvinyl acetate), 50 parts of methanol, 3.2 parts of perchloric acid, and 31 parts of 3,5-dimethyl cyclohexanone, (this amount being 200% of the quantity theoretically required) was heated at 70° C. for 2¼ hours. The solution thus obtained was diluted with 80 parts of methanol and the heating was continued for an additional two hours. The resin was then precipitated from the solution by the addition of water and was thoroughly washed with water. The product was allowed to stand in acetone for several hours in order to remove any remaining unreacted 3,5-dimethyl cyclohexanone, and then was washed well with water and dried. The white resin had about 47% of its hydroxyl groups united with the ketone and was soluble in acetic acid but not in most other common organic solvents. It molded into a light colored, tough chip which softened at 96° C.

*Example II.*—A mixture of 11 parts of polyvinyl alcohol, 45 parts of 3,5-dimethyl cyclohexanone (300% of theory), 3.5 parts of perchloric acid, and 50 parts of methanol was heated at 60° C. for 12 hours. The solution was diluted with about 80 parts of methanol and the resin was precipitated by the addition of water. The resin was treated several times with boiling acetone and, after being washed with water, was filtered and dried at 60° C. in a vacuum oven. Analysis by acetylation indicated that 58% of the hydroxyl groups of the polyvinyl alcohol were condensed with the ketone. The resin was soluble in acetic acid, dioxan, the ethyl ether of ethylene glycol, and ethanol-benzene mixture. It formed a light colored chip which softened at 116° C.

*Example III.*—A mixture of 11 parts of polyvinyl alcohol, 1.8 parts of sulfuric acid, 50 parts of methanol, and 27 parts of 3-methyl cyclohexanone (200% of theory) was heated at 60° C. for 12 hours. The resin was isolated as in Example II. It was soluble in acetic acid and the ethyl ether of ethylene glycol and acetylation indicated about 60% reaction of the hydroxyl groups. The product formed a light colored, tough chip which softened at 96° C.

*Example IV.*—A mixture of 11 parts of polyvinyl alcohol, 14 parts of 3-methyl cyclohexanone (100% of theory), 50 parts of anhydrous methanol and 3.2 parts of perchloric acid was heated at 65° C. for 4 hours. Since no appreciable reaction had occurred as evidenced by the fact that a solution had not formed, an additional 14 parts of 3-methyl cyclohexanone was added and reaction was continued for 3 hours, during which time a clear solution formed. The properties of the resin were similar to those of Example III. This illustrates the effect of using an appreciable excess of ketone.

*Example V.*—Example III was repeated except that the sulfuric acid was replaced by 3.2 parts of perchloric acid, and the temperature was maintained at 70° C. for 7 hours. The white resin isolated from the solution had 50% of its hydroxyl groups united with the ketone, and it formed a tough, light chip which softened at 93° C.

*Example VI.*—A mixture of 11 parts of polyvinyl alcohol, 50 parts of anhydrous ethanol, 25 parts (200% of theory) of cyclohexanone, and 2.5 parts of boron trifluoride-methanol complex was heated at 70° C. for 2½ hours. The solution was diluted with 80 parts of ethanol and the resin was precipitated, washed and dried. The white product had 53% of its hydroxyl groups united with the ketone, and it formed a light colored chip with softened at 81° C.

*Example VII.*—Example VI was repeated with 3.5 parts of perchloric acid as the catalyst instead of the boron trifluoride-methanol complex. The temperature was maintained at 60° C. for 8 hours, and then the resin was isolated as in Example II. The white product was soluble in acetic acid and had 54% of its hydroxyl groups substituted. It formed a light colored, tough chip which softened at 90° C.

*Example VIII.*—A mixture of 11 parts of polyvinyl alcohol, 65 parts (520% of theory) of cyclohexanone, and 2.5 parts of boron trifluoride-methanol complex was heated at 65° C. for 2 hours. The resulting solution was diluted with 60 parts of anhydrous ethanol and heating was continued an additional hour. The solution was further diluted with alcohol, and then the resin was precipitated by the addition of acetone. It was thoroughly washed with acetone and finally with water. The dry, white resin had about 64% of its hydroxyl groups united with the ketone, and had formed a light colored chip which softened at 67° C. It was soluble in ethanol, acetic acid, and the ethyl ether of ethylene glycol.

*Example IX.*—Example VI was repeated except that 3 parts of boron trifluoride-acetic acid complex was employed instead of the boron trifluoride-methanol complex, and heating was maintained at 70° C. for 1½ hours. The product was isolated and warmed at about 50° C. for 2 hours in dilute (about 0.1%) aqueous alkali solution, and then was thoroughly washed and dried. The resin was reacted to the extent of 51%, and formed a light colored chip which softened at 77° C.

*Example X.*—Example VI was repeated except that 2 parts of stannic chloride was used as the catalyst. The product had 40% of its hydroxyl groups united with the ketone, and formed a light, opaque chip which softened at 70° C.

*Example XI.*—Twenty-six (26) parts (200% of theory) of cyclohexanone was added to a solution of 11 parts of polyvinyl alcohol in 100 parts of water and 20 parts of concentrated hydrochloric acid. The mixture was shaken at room temperature for 24 hours, during the course of which a white precipitate had separated. This was filtered and washed well with water, heated at about 50° C. for ¼ hour in dilute alkali, washed and dried. The resin had 50% of its hydroxyl groups reacted with the ketone, and formed a chip which softened at 98° C.

*Example XII.*—A mixture of 11 parts of polyvinyl alcohol, 50 parts of methanol, 15 parts of cyclohexanone (120% of theory), and 2.5 parts of boron trifluoride-methanol complex was heated at 70° C. for ½ hour. The mixture was then diluted with 80 parts of methanol and heated an additional 2 hours). The resin was precipitated, washed and dried. The product formed a light yellow, tough chip which softened at 77° C. and in which 44% of the hydroxyl groups were reacted.

The employment of less cyclohexanone than used in this experiment does not produce sufficient reaction to cause the product to dissolve as it is formed and so a homogeneous, well reacted resin is not obtained.

It will be understood that the above examples are merely illustrative and that the invention broadly comprises reacting polyvinyl alcohol with at least 120% of the theoretical amount required for the reaction of a cyclic ketone, preferably a cyclohexanone, in the presence of a catalyst of acid reaction until the reaction has progressed to the point where at least 40% of the available hydroxyl groups of the polyvinyl alcohol have united with the ketone.

The amount of ketone employed in the reaction may be varied between wide limits, although it is always necessary to use an excess over the quantity theoretically required for complete reaction. In the case of cyclohexanone, a fair reaction is obtained when 120% of the theoretical quantity of the ketone is used, although a larger amount gives a higher degree of reaction and more rapid and satisfactory reaction. The addition of only the theoretically required quantities of the cyclohexanones does not induce sufficient condensation to cause the resins to dissolve as they are formed and, consequently, no satisfactory products are obtained; in general, about 150 to 250% of the theoretically required amount of ketone gives satisfactory reaction and products with desirable properties.

It is preferred to carry out the reaction by suspending the polyvinyl alcohol in a solution of the cyclic ketone and catalyst in a suitable organic medium. Methanol (regular or anhydrous) and anhydrous ethanol are the most practical solvents although other organic solvents or mixtures of solvents may be used. The presence of water, such as occurs in the use of 95% ethanol, has a detrimental effect on the rate and extent of reaction and is to be avoided when an organic medium is used. In some instances, the ketones themselves may be employed as the solvents.

While the presence of water is detrimental when the reaction is carried out in an organic medium which is the preferred procedure, these ketals may be prepared by treating an aqueous solution of polyvinyl alcohol with the cyclic ketone in the presence of a catalyst, in which case the ketal precipitates out as it is formed. In this alternative method of preparing the ketals, an aqueous medium is employed.

Any condensation catalyst of acid reaction can be employed, amongst which are strong inorganic acids, such as sulfuric, phosphoric, hydrochloric and perchloric acids, various complexes of boron trifluoride, aromatic and aliphatic sulfonic acids, and certain acid reacting inorganic salts, such as stannic chloride. The acids and boron trifluoride complexes are most satisfactory than the inorganic salts.

The most desirable temperature range for the reaction is about 50–80° C. although the reaction can be carried out both at higher and lower temperatures than the range cited.

The time required for the reaction is largely dependent on the conditions obtaining and the degree of reaction sought. It is desirable to carry out the reaction for a sufficiently long period of time that a solution of the resin in the solvent be formed, and it is advantageous to continue for an additional period of time in order to reach the desired degree of reaction. Usually a solution has formed within the first hour of reaction, and it appears that a longer period of heating than about 8 hours causes no additional reaction.

The polyvinyl alcohol used in the examples was obtained by hydrolysis of polyvinyl acetate and contained a very small and negligible amount of acetyl radicals. While this invention does not include the use of esters of polyvinyl alcohol, which esters do not give satisfactory products, a relatively small amount of acid radicals may still remain in the polyvinyl alcohol without appreciably impairing the reaction or the product obtained. That is, in place of practically 100% polyvinyl alcohol, a nearly completely (90%) hydrolyzed polyvinyl ester may be used as an equivalent and the term "polyvinyl alcohol" is used herein to denote either pure polyvinyl alcohol or the nearly completely hydrolyzed polyvinyl esters which are, for the purposes of this invention, full equivalents of polyvinyl alcohol.

As shown by the examples, it is preferred to isolate the ketal by precipitating from the solution in which it is formed, by the addition of water. Likewise, it is frequently desirable to treat the precipitate with acetone in order to remove any remaining ketone. Also, it may be desirable to treat the resin in order to neutralize any remaining acid catalyst; treating the resin for about ½ hour at 25–50° C. with dilute (0.1%) aqueous alkali will accomplish this.

The polyvinyl ketals of the present invention may be used for the preparation of molded articles and for the preparation of films both by casting from a solution, hot pressing, and melt extrusion. They are also adapted for the preparation of molded articles or sheeting when modified with plasticizers, fillers, pigments, dyes, softeners, or other natural or synthetic resins. They may also be used as coating compositions either alone or when admixed with other resins, pigments, dyes, plasticizers, or softeners, such coating compositions being useful for coating or impregnating surfaces such as wood, textiles, leather, metals, glass, paper, stone, brick, concrete, plastics, and the like.

The term "cyclic ketone" is used in the description and claims to connote both mono- and polynuclear hydroaromatic ketones in which the ketonic oxygen is linked directly to a ring carbon in the hydroaromatic ring. The polynuclear ketones may consist of fused ring systems or the rings may be joined through a monovalent linkage.

The products of the present invention have vastly improved properties over any of the alleged polyvinyl ketals that have been obtained by carrying out instructions in the prior art. In general the polyvinyl ketals of the present invention are characterized by giving light colored, tough moldings with quite high softening points. The improvement in the properties is due to the fact that the percentage of hydroxyl groups of the polyvinyl alcohol which have been united with the ketone, is far greater than has heretofore been obtained. While it may be that some reaction is effected between the hydroxyl groups of the polyvinyl alcohol and ketone by carrying out the prior art disclosures, the reaction does not proceed to a point where really useful ketals are obtained.

As many apparently widely different embodiments of this invention may be made without departing from the spirit and scope thereof, it is to be understood that the invention is not limited to the specific embodiments thereof except as defined in the appended claims.

I claim:

1. Process of preparing a polyvinyl ketal which comprises heating at about 70° C. for approximately 2¼ hours a mixture of 11 parts of preformed polyvinyl alcohol, 50 parts of methanol, 31 parts of 3,5-dimethyl cyclohexanone, and a condensation catalyst of acid reaction, thereafter diluting the reaction mixture with 80 parts more of methanol, continuing the heating for an additional two hours, and then adding water to the reaction mixture to precipitate the polyvinyl ketal formed.

2. A polyvinyl ketal consisting of polyvinyl alcohol having at least 40% of the available hydroxyl groups united with 3,5-dimethyl cyclohexanone.

SIDNEY C. OVERBAUGH.